(12) United States Patent
Saito et al.

(10) Patent No.: US 10,559,968 B2
(45) Date of Patent: Feb. 11, 2020

(54) CHARGE/DISCHARGE CONTROL CIRCUIT AND BATTERY APPARATUS

(71) Applicant: ABLIC Inc., Chiba-shi, Chiba (JP)

(72) Inventors: Hiroshi Saito, Chiba (JP); Akihiko Suzuki, Hamamatsu (JP); Takahiro Kuratomi, Hamamatsu (JP)

(73) Assignee: ABLIC INC., Chiba (JP)

( * ) Notice: Subject to any disclaimer, the term of this patent is extended or adjusted under 35 U.S.C. 154(b) by 55 days.

(21) Appl. No.: 15/951,939

(22) Filed: Apr. 12, 2018

(65) Prior Publication Data

US 2018/0301921 A1   Oct. 18, 2018

(30) Foreign Application Priority Data

Apr. 13, 2017 (JP) .................. 2017-079892

(51) Int. Cl.
*H02J 7/00* (2006.01)

(52) U.S. Cl.
CPC .......... *H02J 7/0068* (2013.01); *H02J 7/0081* (2013.01); *H02J 7/0086* (2013.01)

(58) Field of Classification Search
CPC ...... H02J 7/0068; H02J 7/0031; H02J 7/0047; H02J 7/0081; H02J 7/0086
USPC ....................................... 320/103, 127–128
See application file for complete search history.

(56) References Cited

U.S. PATENT DOCUMENTS

| | | | |
|---|---|---|---|
| 2005/0156574 A1* | 7/2005 | Sato ................. | H02H 7/18 320/134 |
| 2010/0141215 A1* | 6/2010 | Takeda ............. | H01M 10/48 320/136 |
| 2012/0249087 A1* | 10/2012 | Kimura ............ | H02H 7/18 320/164 |
| 2016/0013668 A1 | 1/2016 | Fukuchi | |

FOREIGN PATENT DOCUMENTS

JP        2016-019387 A      2/2016

* cited by examiner

*Primary Examiner* — Zixuan Zhou
(74) *Attorney, Agent, or Firm* — Brinks Gilson & Lione

(57) ABSTRACT

A charge/discharge control circuit includes a first power supply terminal connected to a first electrode of a secondary battery, and a discharge control output circuit which outputs a discharge control signal to a gate of a discharge control FET which controls discharging of the secondary battery. The discharge control output circuit includes a clamp voltage output circuit which outputs a clamp voltage lower than a voltage of the first power supply terminal to a discharge control terminal to turn on the discharge control FET when the voltage of the first power supply terminal is higher than a prescribed voltage, and a power supply voltage output circuit which outputs the voltage of the first power supply terminal to the discharge control terminal to turn on the discharge control FET when the voltage of the first power supply terminal is equal to or less than the prescribed voltage.

19 Claims, 3 Drawing Sheets

CHARGE/DISCHARGE CONTROL CIRCUIT AND BATTERY APPARATUS

RELATED APPLICATIONS

This application claims priority under 35 U.S.C. § 119 to Japanese Patent Application No. 2017-079892 filed on Apr. 13, 2017, the entire content of which is hereby incorporated by reference.

BACKGROUND OF THE INVENTION

Field of the Invention

The present invention relates to a charge/discharge control circuit and a battery apparatus.

Background Art

There has heretofore been known a charge/discharge control circuit including a first power supply terminal connected to one electrode of a secondary battery, a second power supply terminal connected to the other electrode of the secondary battery, a charge control terminal connected to a gate of a charge control FET which controls charging to the secondary battery, a discharge control terminal connected to a gate of a discharge control FET which controls discharging from the secondary battery, a control circuit which controls the charge control FET and the discharge control FET, a charge control output circuit which outputs a charge control signal to the charge control FET, and a discharge control output circuit which outputs a discharge control signal to the discharge control FET (refer to, for example, Japanese Patent Application Laid-Open No. 2016-019387).

SUMMARY OF THE INVENTION

In the charge/discharge control circuit described in Japanese Patent Application Laid-Open No. 2016-019387, the voltage of the charge control signal supplied from the charge control output circuit for turning the charge control FET on always becomes a voltage corresponding to the magnitude of a power supply voltage (voltage of secondary battery). Likewise, the voltage of the discharge control signal supplied from the discharge control output circuit for turning the discharge control FET on also always becomes a voltage corresponding to the magnitude of the power supply voltage.

On the other hand, in a multi-cell battery apparatus in particular, a charge control FET and a discharge control FET having a low gate breakdown voltage may be used to make component costs low. In a charge/discharge control circuit, accordingly the voltages of a charge control signal and a discharge control signal should be limited to a voltage lower than a power supply voltage respectively so as not to exceed the gate breakdown voltages of the charge control FET and the discharge control FET.

However, for example, when a discharge control output circuit is configured to output a voltage lower than a power supply voltage as a discharge control signal for turning a discharge control FET on, a discharge control output circuit outputs, even when the power supply voltage is reduced, a voltage further lower than the reduced power supply voltage. As a result, there is a fear that an on-resistance value of the discharge control FET increases so that the discharge control FET generates heat.

This is similar even to the charge control output circuit and the charge control FET.

Thus, the present invention aims to provide a charge/discharge control circuit and a battery apparatus capable of controlling the voltage of a discharge control signal and/or a charge control signal to turn on a discharge control FET and/or a charge control FET, so as not to exceed a gate breakdown voltage of the discharge control FET and/or the charge control FET and so as to suppress increase of an on-resistance value thereof.

In one aspect of the present invention, there is provided a charge/discharge control circuit which includes a first power supply terminal connected to a first electrode of a secondary battery, a second power supply terminal connected to a second electrode of the secondary battery, a discharge control terminal connected to a gate of a discharge control FET which controls discharging of the secondary battery, a discharge control output circuit configured to output a discharge control signal to the discharge control terminal, and a control circuit configured to control the discharge control output circuit, and in which the discharge control output circuit has a clamp voltage output circuit which outputs a clamp voltage lower than a voltage of the first power supply terminal to the discharge control terminal to turn on the discharge control FET when the voltage of the first power supply terminal is higher than a prescribed voltage, and a power supply voltage output circuit which outputs the voltage of the first power supply terminal to the discharge control terminal to turn on the discharge control FET when the voltage of the first power supply terminal is equal to or less than the prescribed voltage.

Further, in another aspect of the present invention, there is provided a charge/discharge control circuit which includes a first power supply terminal connected to a first electrode of a secondary battery, a charge control terminal connected to a gate of a charge control FET which controls charging of the secondary battery, an external voltage input terminal connected to a source of the charge control FET and to which a charger is connected between the external voltage input terminal and the first power supply terminal, a charge control output circuit which outputs a charge control signal to the charge control terminal, and a control circuit which controls the charge control output circuit, and in which the charge control output circuit has a clamp voltage output circuit which outputs a clamp voltage lower than a voltage of the first power supply terminal to the charge control terminal to turn on the charge control FET when the voltage of the first power supply terminal is higher than a prescribed voltage, and a power supply voltage output circuit which outputs the voltage of the first power supply terminal to the charge control terminal to turn on the charge control FET when the voltage of the first power supply terminal is equal to or less than the prescribed voltage.

Further, one aspect of the present invention is a battery apparatus equipped with either of the above charge/discharge control circuits.

According to the present invention, the voltage of the discharge control signal output to turn on the discharge control FET can be controlled so as not to exceed a gate breakdown voltage of the discharge control FET and so as to suppress increase of an on-resistance value of the discharge control FET.

Further, according to the present invention, the voltage of the charge control signal output to turn on the charge control FET can be controlled so as not to exceed a gate breakdown voltage of the charge control FET and so as to suppress increase of an on-resistance value of the charge control FET.

DETAILED DESCRIPTION OF THE EMBODIMENTS

Preferred embodiments of the present invention will hereinafter be described with reference to the accompanying drawings.

Figure 1:
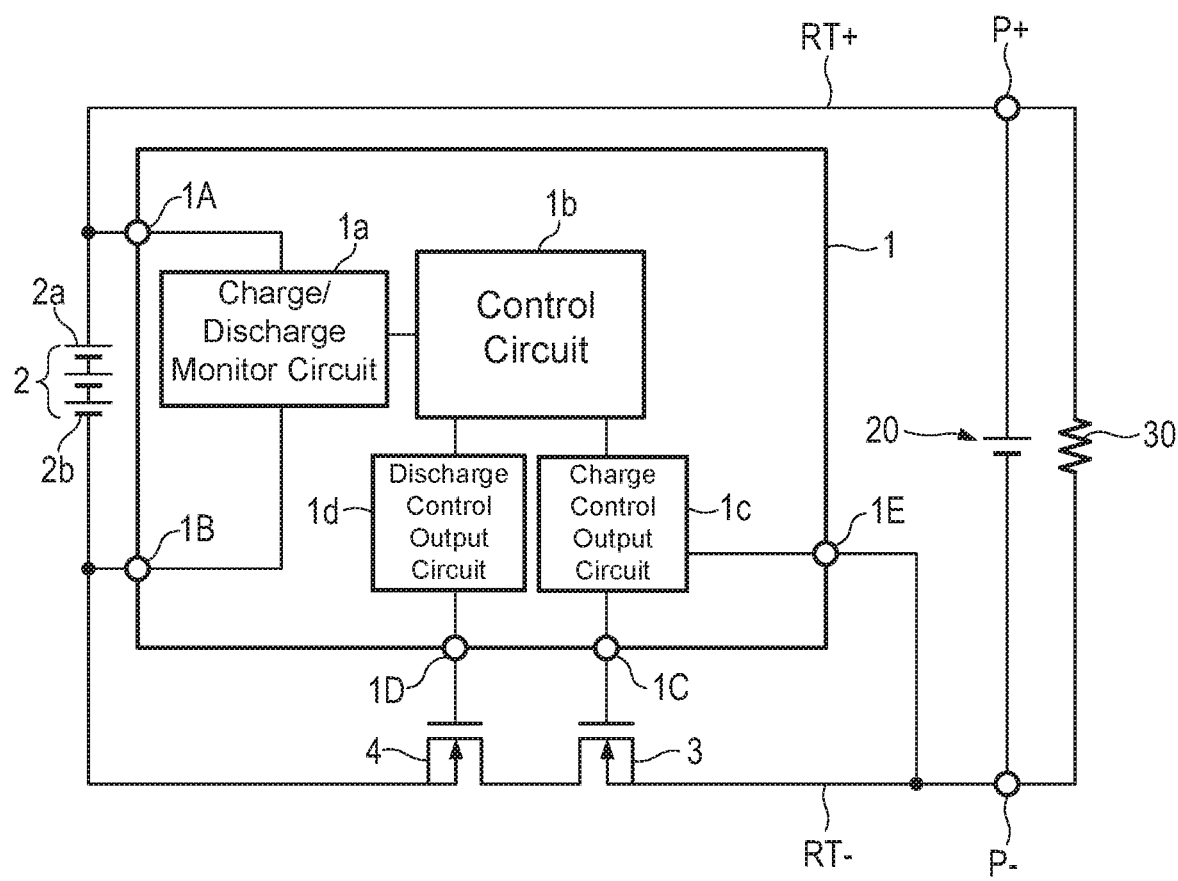
FIG. 1 is a block diagram illustrating one example of a battery apparatus equipped with a charge/discharge control circuit according to an embodiment of the present invention.

FIG. 1 is a diagram illustrating a battery apparatus 10 equipped with a charge/discharge control circuit 1 according to one embodiment of the present invention.

The battery apparatus 10 is equipped with the charge/discharge control circuit 1, a multi-cell secondary battery 2, charge/discharge paths RT+ and RT−, charge/discharge terminals P+ and P−, a charge control FET3, and a discharge control FET4. The charge control FET3 controls charging to the secondary battery 2. The discharge control FET4 controls discharging from the secondary battery 2.

The charge/discharge path RT+ is connected to a first electrode 2a of the secondary battery 2. The charge/discharge terminal P+ is provided in the charge/discharge path RT+. The charge/discharge path RT− is connected to a second electrode 2b of the secondary battery 2. The charge/discharge terminal P− is provided in the charge/discharge path RT−. The charge control FET3 and the discharge control FET4 are arranged in the charge/discharge path RT−. A source of the charge control FET3 is connected to the charge/discharge terminal P−. A drain of the charge control FET3 is connected to a drain of the discharge control FET4. A source of the discharge control FET4 is connected to the second electrode 2b of the secondary battery 2.

A charger 20 and a load 30 are connected in parallel between the charge/discharge terminal P+ and the charge/discharge terminal P−.

The charge/discharge control circuit 1 is equipped with a first power supply terminal 1A, a second power supply terminal 1B, a charge control terminal 1C, a discharge control terminal 1D, an external voltage input terminal 1E, a charge/discharge monitor circuit 1a, a control circuit 1b, a charge control output circuit 1c, and a discharge control output circuit 1d.

The first power supply terminal 1A is connected to the first electrode 2a of the secondary battery 2. Further, the first power supply terminal 1A is connected to the charge/discharge monitor circuit 1a. The second power supply terminal 1B is connected to the second electrode 2b of the secondary battery 2. Further, the second power supply terminal 1B is connected to the charge/discharge monitor circuit 1a. The charge/discharge monitor circuit 1a is connected to the control circuit 1b. The control circuit 1b is connected to the charge control output circuit 1c and the discharge control output circuit 1d.

The charge control output circuit 1c is connected to the charge control terminal 1C. The charge control terminal 1C is connected to a gate of the charge control FET3. Further, the discharge control output circuit 1d is connected to the discharge control terminal 1D. The discharge control terminal 1D is connected to a gate of the discharge control FET4.

The charge/discharge monitor circuit 1a monitors a charge/discharge state of the secondary battery 2. The control circuit 1b controls the charge control output circuit 1c and the discharge control output circuit 1d, based on a signal supplied from the charge/discharge monitor circuit 1a. The charge control output circuit 1c outputs a charge control signal to the charge control FET3, based on a control signal supplied from the control circuit 1b. The discharge control output circuit 1d outputs a discharge control signal to the discharge control FET4, based on a control signal supplied from the control circuit 1b.

The details of the discharge control output circuit 1d illustrated in FIG. 1 will first be described below.

When the voltage of the first power supply terminal 1A is higher than a prescribed voltage, the discharge control output circuit 1d outputs a clamp voltage lower than the voltage of the first power supply terminal 1A to the discharge control terminal 1D to turn on the discharge control FET4. Here, the clamp voltage is a voltage which doesn't exceed a gate breakdown voltage of the discharge control FET4 and at which the on-resistance value of the discharge control FET4 becomes equal to or less than a desired resistance value when the clamp voltage is applied to the gate of the discharge control FET4.

Further, the voltage of the first power supply terminal 1A is equal to or less than the prescribed voltage, the discharge control output circuit 1d outputs the voltage of the first power supply terminal 1A to the discharge control terminal 1D to turn on the discharge control FET4.

Incidentally, the prescribed voltage is also a voltage at which the desired clamp voltage is not maintained, when the voltage of the first power supply terminal 1A lowers.

Figure 2:
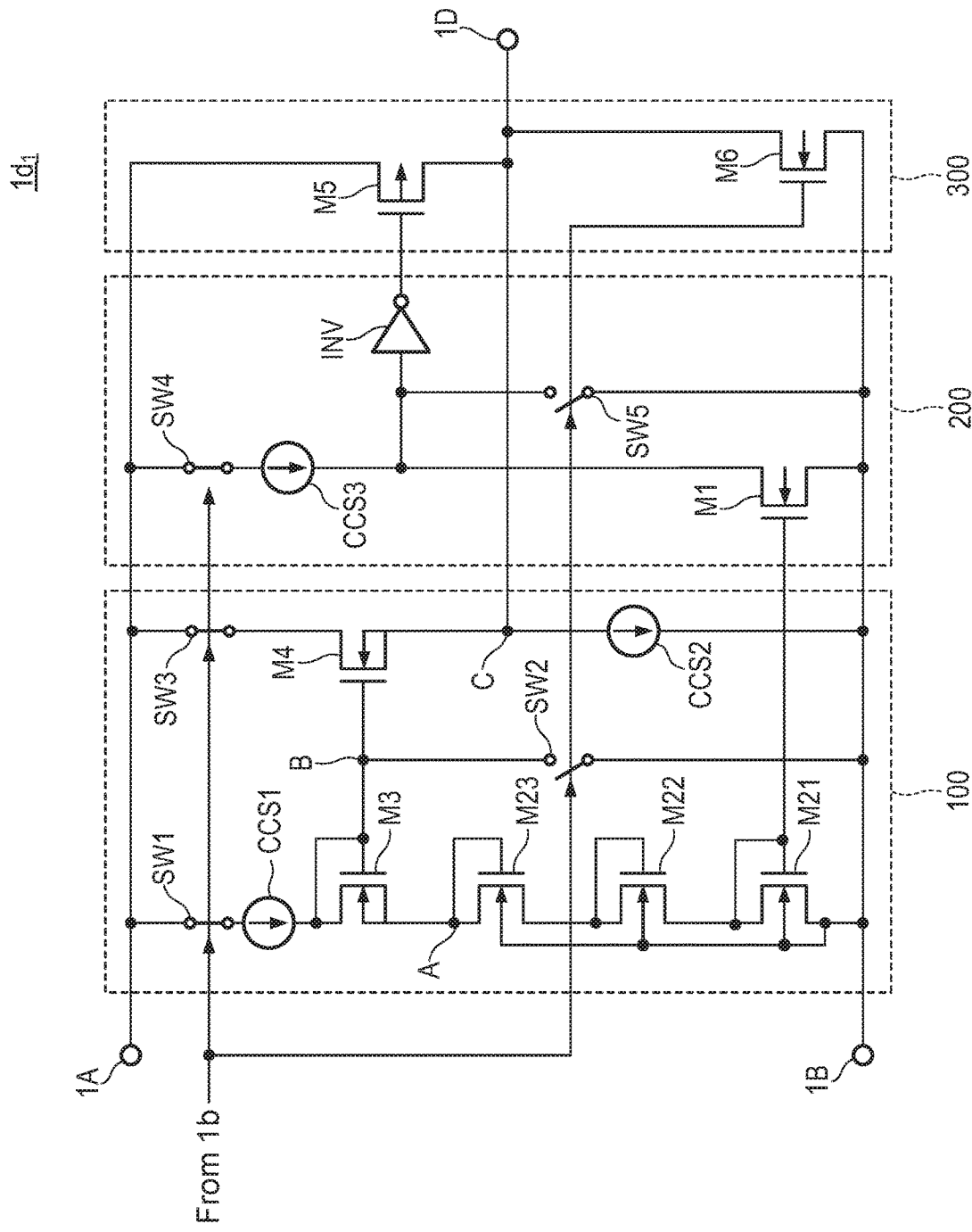
FIG. 2 is a circuit diagram illustrating a first concrete example of a charge control output circuit illustrated in FIG. 1.

FIG. 2 is a circuit diagram illustrating a discharge control output circuit 1d1 which is the first concrete example of the discharge control output circuit 1d illustrated in FIG. 1.

The discharge control output circuit 1d1 is equipped with a clamp voltage output circuit 100, a determination circuit 200, and a power supply voltage output circuit 300.

The clamp voltage output circuit 100 includes a constant current source CCS1 having one end connected to a first power supply terminal 1A through a switch SW1, an NMOS (first conductivity type MOS) transistor M3 having a gate and a drain both connected to the other end of the constant current source CCS1, NMOS transistors M21 through M23 which are connected to form a current path between a source (node A) of the NMOS transistor M3 and a second power supply terminal 1B and respectively diode-connected, an NMOS transistor M4 current-mirror connected to the NMOS transistor M3, and a constant current source CCS2 having one end connected to a source (node C) of the NMOS transistor M4 and a discharge control terminal 1D and the other end connected to the second power supply terminal 1B. Then, a node B being a connecting point of the gate of the NMOS transistor M3 and a gate of the NMOS transistor M4 is connected to the second power supply terminal 1B through a switch SW2. Further, a drain of the NMOS transistor M4 is connected to the first power supply terminal 1A through a switch SW3.

The determination circuit 200 includes a constant current source CCS3 having one end connected to the first power supply terminal 1A through a switch SW4, an NMOS transistor M1 which has a drain connected to the other end of the constant current source CCS3 and is current-mirror connected to the NMOS transistor M21, of the NMOS transistors M21 through M23, whose source being connected to the second power supply terminal 1B, and an inverter INV which receives the voltage of the drain of the NMOS transistor M1 at its input terminal. Further, the input terminal of the inverter INV is connected to the second power supply terminal 1B through a switch SW5.

The power supply voltage output circuit 300 includes a PMOS (second conductivity type MOS) transistor M5 having a gate connected to an output terminal (the output of the determination circuit 200) of the inverter INV, a source connected to the first power supply terminal 1A, and a drain connected to the discharge control terminal 1D, and an NMOS transistor M6 which receives a control signal supplied from a control circuit 1b at its gate, and has a drain connected to the discharge control terminal 1D and a source connected to the second power supply terminal 1B.

The NMOS transistor M6 is provided as a driver for supplying a signal of an L level is supplied to the discharge control terminal 1D. However, the NMOS transistor M6 is not essential and can be deleted, and instead, a P-channel open-drain output from the PMOS transistor M5 may be used.

A description will be made here about the operations of the switches SW1 through SW5. Any of the switches SW1 through SW5 is controlled by a control signal supplied from the control circuit 1b.

The control circuit 1b outputs a signal of an L level to turn on the switches SW1, SW3, and SW4 and turn off the switches SW2 and SW5 to turn on the discharge control FET4. FIG. 2 illustrates the state of each switch in this case. Since, at this time, the NMOS transistor M6 receives the signal of the L level supplied from the control circuit 1b at its gate, the NMOS transistor M6 turns off.

On the other hand, the switches SW1, SW3, and SW4 are turned off, and the switches SW2 and SW5 are turned on to turn off the discharge control FET4. Each switch is brought into a state opposite to that in FIG. 2. Since, at this time, the NMOS transistor M6 receives the signal of the H level supplied from the control circuit 1b at its gate, the NMOS transistor M6 turns on.

A description will hereinafter be made about the operation of the discharge control output circuit 1d1 assuming that the switches SW1, SW3, and SW4 are turned on, and the switches SW2 and SW5 are turned off to turn on the discharge control FET4.

When the voltage of the first power supply terminal 1A is higher than the prescribed voltage, the NMOS transistors M21 through M23 are all turned on in the clamp voltage output circuit 100, so that the voltage of the node A is brought to a value obtained by summing respective threshold voltages of the NMOS transistors M21 through M23. Then, the voltage of the node B is brought to a value obtained by adding a threshold voltage of the NMOS transistor M3 to the voltage of the node A. Further, the voltage of the node C is brought to a value obtained by subtracting a threshold value of the NMOS transistor M4 from the voltage of the node B. The voltage of the node C at this time becomes a clamp voltage.

Since the NMOS transistor M1 in the determination circuit 200 with the gate connected to that of the NMOS transistor M21 also turns on, the voltage of the input terminal of the inverter INV lowers. Then, falling of this voltage below an inverting voltage of the inverter INV makes the inverter INV output a signal of an H level as the output of the determination circuit 200. Thus, it is determined by the determination circuit 200 that the voltage of the first power supply terminal 1A is higher than the prescribed voltage.

Thus, since the gate of the PMOS transistor M5 in the power supply voltage output circuit 300 becomes an H level, the PMOS transistor M5 turns off. Since the NMOS transistor M6 is also turned off, the clamp voltage generated at the node C is supplied to the discharge control terminal 1D.

Thus, when the voltage of the first power supply terminal 1A is higher than the prescribed voltage, the discharge control output circuit 1d1 outputs the clamp voltage lower than the voltage of the first power supply terminal 1A to the discharge control terminal 1D.

Incidentally, if the NMOS transistors M3 and M4 are transistors equal in threshold voltage, the voltage of the node C becomes the same voltage as that of the node A. That is, the clamp voltage becomes a value obtained by summing the respective threshold voltages of the NMOS transistors M21 through M23 diode-connected to each other. Thus, the number of the diode-connected NMOS transistors is not limited to three, but may be appropriately increased or decreased in such a manner that the clamp voltage becomes a desired value. Further, a plurality of diodes may be used instead of the diode-connected NMOS transistors.

On the other hand, when the voltage of the first power supply terminal 1A becomes equal to or less than the prescribed voltage, the NMOS transistors M21 through M23 generating the clamp voltage respectively become unable to maintain a gate-source voltage. Further, when the gate-source voltage of the NMOS transistor M21 lowers, the gate-source voltage of the NMOS transistor M1 with the gate connected to that of the NMOS transistor M21 is also lowered, so that the impedance of the NMOS transistor M1 is made large.

Since the voltage of the input terminal of the inverter INV in the determination circuit 200 is determined by the impedances of the constant current source CCS3 and the NMOS transistor M1, the voltage of the input terminal of the inverter INV rises when the impedance of the NMOS transistor M1 becomes large as described above. Then, falling of this voltage above the inverting voltage of the inverter INV makes the inverter INV output a signal of an L level as the output of the determination circuit 200. In this way, it is determined by the determination circuit 200 that the voltage of the first power supply terminal 1A lowers to the prescribed voltage or less.

Thus, since the gate of the PMOS transistor M5 in the power supply voltage output circuit 300 becomes an L level, the PMOS transistor M5 turns on. Since the PMOS transistor M5 turns on, and the NMOS transistor M6 turns off, the discharge control output circuit 1d1 outputs the voltage of the first power supply terminal 1A to the discharge control terminal 1D.

At this time, since the NMOS transistor M4 becomes high in source voltage and thereby turns off, the operation of the PMOS transistor M5 is prevented from being impeded.

Thus, when the voltage of the first power supply terminal 1A lowers to the prescribed voltage or less, the discharge control output circuit 1d1 outputs the voltage of the first power supply terminal 1A to the discharge control terminal 1D.

According to the discharge control output circuit 1d1 of the present example as described above, the voltage of the discharge control signal output to the discharge control terminal 1D can be set as the clamp voltage to turn on the discharge control FET4 when the voltage of the first power supply terminal 1A is high, whereas when the voltage of the first power supply terminal 1A is low, the voltage of the discharge control signal can be switched to the voltage of the first power supply terminal 1A. It is therefore possible to prevent the voltage applied to the gate of the discharge control FET4 from exceeding its breakdown voltage and suppress increase of the on-resistance value thereof.

Incidentally, when the voltage of the first power supply terminal 1A is higher than the prescribed voltage, the voltage of the node B becomes the voltage (i.e., voltage obtained by further adding the threshold voltage of the NMOS transistor M3 to the value obtained by summing the respective threshold voltages of the NMOS transistors M21 through M23) lower than the voltage of the first power supply terminal 1A. Further, when the voltage of the first power supply terminal 1A becomes lower than the prescribed voltage, the voltage of the node B becomes the same potential as the voltage of the first power supply terminal 1A. Thus, it is also considered to output the voltage of the node B to the discharge control terminal 1D. Since, however, the voltage of the node B is only generated by the constant current source CCS1, drivability is insufficient to drive (turn on) the discharge control FET4 when the voltage of the node B is supplied directly from the discharge control terminal 1D as the discharge control signal.

To make up for the shortage of such drivability, the source-follower connected NMOS transistor M4 is used in the present example. The drivability is thus ensured. However, the voltage of the node C is always given by subtracting the threshold voltage of the NMOS transistor M4 from the voltage of the node B. The voltage supplied to the discharge control terminal 1D thereby becomes lower than the voltage of the first power supply terminal 1A when the voltage of the first power supply terminal 1A lowers, resulting in increase of the on-resistance value of the discharge control FET4.

Thus, the configuration of the discharge control output circuit 1d1 of the present example becomes effective.

Figure 3:
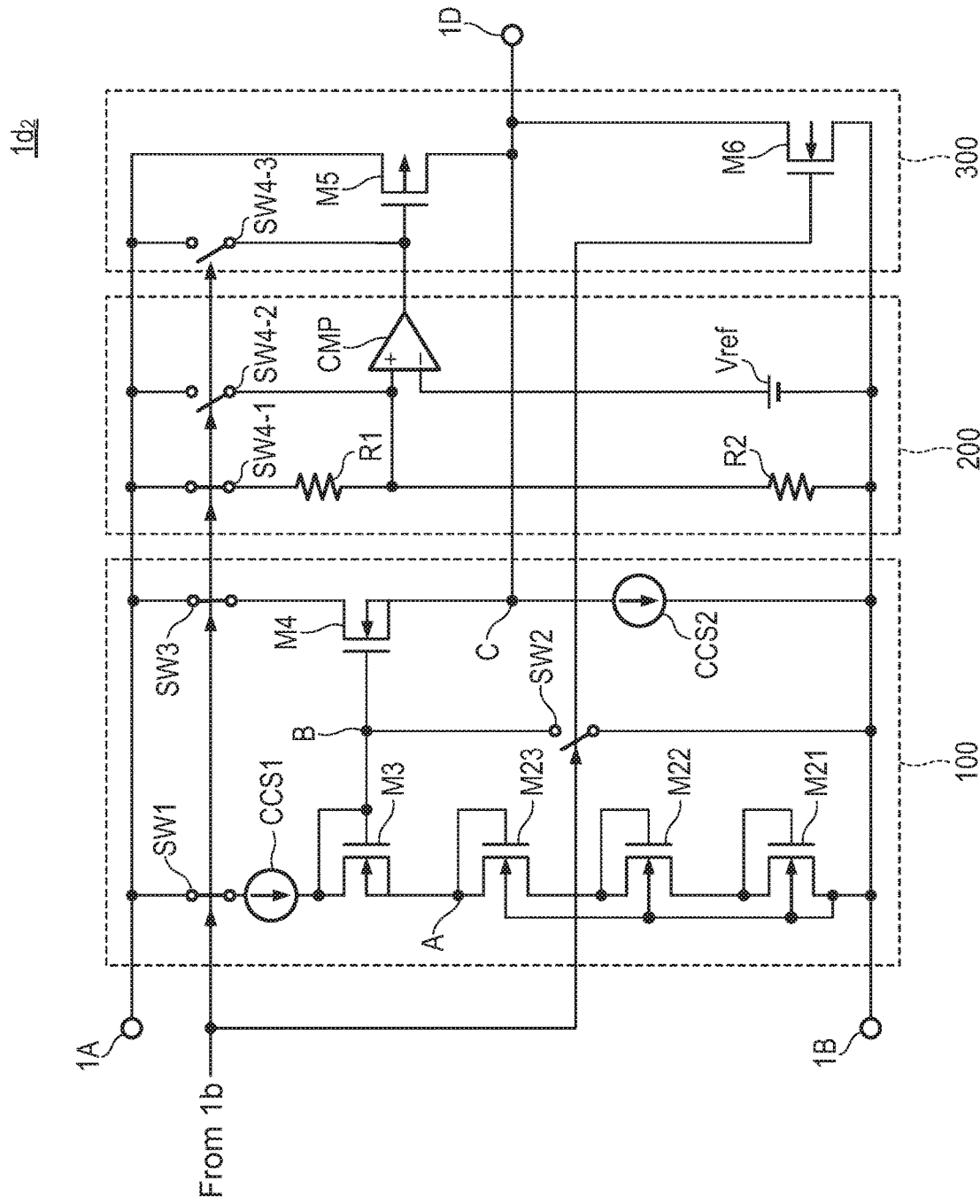
FIG. 3 is a circuit diagram illustrating a second concrete example of the discharge control output circuit illustrated in FIG. 1.

FIG. 3 is a circuit diagram illustrating a discharge control output circuit 1d2 being a second concrete example of the discharge control output circuit 1d illustrated in FIG. 1.

The discharge control output circuit 1d2 of the present example is different from the discharge control output circuit 1d1 of the first concrete example illustrated in FIG. 2 in that the switches SW4 and SW5 are omitted and SW4-1, SW4-2, and SW4-3 are added, and in terms of a circuit configuration of a determination circuit 200. Since other points are the same as those of the discharge control output circuit 1d1 illustrate in FIG. 2, the same components are denoted by the same reference numerals, and their dual description will be omitted as appropriate.

The determination circuit 200 in the discharge control output circuit 1d2 includes a resistor R1 having one end connected to a first power supply terminal 1A through the switch SW4-1, a resistor R2 connected between the other end of the resistor R1 and a second power supply terminal 1B, and a comparator CMP having a non-inversion input terminal connected to the other end of the resistor R1 and connected to the first power supply terminal 1A through the switch SW4-2, and an inversion input terminal input with a reference voltage Vref. Incidentally, the reference voltage Vref is set to a voltage obtained by dividing the prescribed voltage by the resistors R1 and R2.

Further, an output terminal of the comparator CMP is connected to a gate of a PMOS transistor M5 and connected to the first power supply terminal 1A through the switch SW4-3.

The switches SW4-1, SW4-2, and SW4-3 are respectively controlled by a control signal supplied from a control circuit 1b as with the switches SW1 through SW3.

When a discharge control FET4 turns on, the control circuit 1b outputs a signal of an L level to turn on the switches SW1, SW3, and SW4-1 and turn off the switches SW2, SW4-2 and SW4-3. FIG. 3 illustrates the state of each switch in this case. At this time, an NMOS transistor M6 turns off because the NMOS transistor M6 receives the signal of the L level supplied from the control circuit 1b at its gate. Thus, a signal of an H level is supplied to a discharge control terminal 1D.

On the other hand, when the discharge control FET4 turns off, the switches SW1, SW3, and SW4-1 are turned off, and the switches SW2, SW4-2, and SW4-3 are turned on. Each switch is brought into a state opposite to that in FIG. 3. Since, at this time, the NMOS transistor M6 receives the signal of the H level supplied from the control circuit 1b at its gate, the NMOS transistor M6 turns on. Thus, a signal of an L level is supplied to the discharge control terminal 1D.

A description will hereinafter be made about the operation of the discharge control output circuit 1d2 where the discharge control FET4 turns on assuming that the switches SW1, SW3, and SW4-1 are turned on, and the switches SW2, SW4-2, and SW4-3 are turned off.

When the voltage of the first power supply terminal 1A is higher than the prescribed voltage, a clamp voltage output circuit 100 is operated in a manner similar to the clamp voltage output circuit 100 of the discharge control output circuit 1d1 to generate a clamp voltage at a node C.

In the determination circuit 200, the comparator CMP compares the voltage obtained by dividing the voltage of the first power supply terminal 1A by the resistors R1 and R2 with the reference voltage Vref and outputs a comparison result therefrom. Here, since the voltage of the first power supply terminal 1A is higher than the prescribed voltage, the comparator CMP outputs a signal of an H level as the output of the determination circuit 200. In this way, it is determined by the determination circuit 200 that the voltage of the first power supply terminal 1A is higher than the prescribed voltage.

Thus, since the gate of the PMOS transistor M5 in a power supply voltage output circuit 300 becomes an H level, the PMOS transistor M5 turns off. Since the NMOS transistor M6 is also turned off, the clamp voltage generated at the node C is supplied to the discharge control terminal 1D.

On the other hand, since the voltage obtained by dividing the voltage of the first power supply terminal 1A by the resistors R1 and R2 becomes lower than the reference voltage Vref in the determination circuit 200 when the voltage of the first power supply terminal 1A becomes the prescribed voltage or less, the comparator CMP outputs a signal of an L level as the output of the determination circuit 200. In this way, it is determined by the determination circuit 200 that the voltage of the first power supply terminal 1A lowers to the prescribed voltage or less.

Thus, since the gate of the PMOS transistor M5 in the power supply voltage output circuit 300 becomes an L level, the PMOS transistor M5 turns on. Since the PMOS transistor M5 turns on, and the NMOS transistor M6 turns off, the discharge control output circuit 1d2 outputs the voltage of the first power supply terminal 1A to the discharge control terminal 1D.

Since, at this time, the NMOS transistor M4 becomes high in its source voltage and thereby turns off, the operation of the PMOS transistor M5 is prevented from being impeded.

Thus, the discharge control output circuit 1d2 outputs the voltage of the first power supply terminal 1A to the discharge control terminal 1D when the voltage of the first power supply terminal 1A lowers to the prescribed voltage or less.

Even by the discharge control output circuit 1d2 of the present example as described above, as with the discharge control output circuit 1d1, the voltage of the discharge control signal output to the discharge control terminal 1D when the discharge control FET4 turns on can be set as the clamp voltage when the voltage of the first power supply terminal 1A is high, whereas when the voltage of the first power supply terminal 1A is low, the voltage of the discharge control signal can be switched to the voltage of the first power supply terminal 1A. It is therefore possible to prevent the voltage applied to the gate of the discharge control FET4 from exceeding its breakdown voltage and suppress increase of the on-resistance value.

Although the details of the discharge control output circuit 1d illustrated in FIG. 1 has been described so far, the charge control output circuit 1c illustrated in FIG. 1 is also almost similar to the discharge control output circuit 1d in terms of its details.

That is, when the charge control FET3 turns on, and the voltage of the first power supply terminal 1A is higher than a prescribed voltage, the charge control output circuit 1c outputs a clamp voltage lower than the voltage of the first power supply terminal 1A to the charge control terminal 1C. Here, the clamp voltage is a voltage which does not to exceed a gate breakdown voltage of the charge control FET3 and at which an on-resistance value of the charge control FET3 becomes equal to or less than a desired resistance value when the clamp voltage is applied to the gate of the charge control FET3.

Further, when the charge control FET3 turns on, and the voltage of the first power supply terminal 1A is the prescribed voltage or less, the charge control output circuit 1c outputs the voltage of the first power supply terminal 1A to the charge control terminal 1C.

However, the charge control output circuit 1c is provided with a voltage from the external voltage input terminal 1E connected to the source (charge/discharge terminal P−) of the charge control FET3 and configured with the charger being connected between the external voltage input terminal 1E and the first power supply terminal 1A, as illustrated in FIG. 1. Further, when the charge control FET3 turns off, the charge control output circuit 1c supplies the voltage of the external voltage input terminal 1E to the gate of the charge control FET3.

Accordingly, first and second concrete examples of the charge control output circuit 1c respectively have configurations corresponding to the discharge control output circuit 1d1 being the first concrete example of the discharge control output circuit 1d, and the discharge control output circuit 1d2 being the second concrete example thereof, both of which are illustrated in FIGS. 2 and 3. They are configured to replace the second power supply terminal 1B by the external voltage input terminal 1E and replace the discharge control terminal 1D by the charge control terminal 1C.

Incidentally, in the present embodiment, both the discharge control output circuit 1d and the charge control output circuit 1c may be configured as described above. Further, only the discharge control output circuit 1d or only the charge control output circuit 1c may be configured as described above.

Although the embodiments of the present invention and their modifications have been described above, these embodiments and modifications have been presented as examples and are not intended to limit the scope of the invention. These embodiments and modifications can be implemented in various other forms, and various omissions, substitutions and modifications can be made within the scope not departing from the spirit of the invention. These embodiments and modifications are included in the scope and spirit of the invention and also included in the invention described in the scope of the appended claims and within the scope of equivalency thereof. Further, the above-described embodiments and their modifications can be appropriately combined with each other.

For example, in the above embodiment, the prescribed voltage in the discharge control output circuit 1d and the prescribed voltage in the charge control output circuit 1c may be the same or different from each other. When they are the same, FETs having the same breakdown voltage can be used as the discharge control FET4 and the charge control FET3. When they are different from each other, FETs different in breakdown voltage can be used in matching with the respective clamp voltages supplied from the discharge control output circuit 1d and the charge control output circuit 1c.

Also, although since the present invention is particularly effective when the secondary battery is multi-cell, the above embodiment has illustrated the example in which the secondary battery 2 is multi-cell, the secondary battery 2 may of course be configured as one cell.

Further, although the above embodiment has illustrated the example in which the discharge control output circuit 1d and the charge control output circuit 1c are respectively configured to use the NMOS transistor as the first conductivity type MOS transistor and use the PMOS transistor as the second conductivity type MOS transistor, the embodiment is not limited to this. The embodiment may be configured in such a manner that the discharge control FET4 and the charge control FET3 are disposed on the charge/discharge path RT+ side, and the conductivity types of the MOS transistors in the discharge control output circuit 1d and the charge control output circuit 1c are interchanged, that is, the first conductivity type MOS transistor is configured as the PMOS transistor and the second conductivity type MOS transistor is configured as the NMOS transistor, and the discharge control FET4 and the charge control FET3 disposed on the charge/discharge path RT+ side are respectively controlled by the outputs of the discharge control output circuit 1d and the charge control output circuit 1c.

What is claimed is:
1. A charge/discharge control circuit comprising:
a first power supply terminal connected to a first electrode of a secondary battery;
a second power supply terminal connected to a second electrode of the secondary battery;
a discharge control terminal connected to a gate of a discharge control field effect transistor (FET) which controls discharging of the secondary battery;
a discharge control output circuit configured to output a discharge control signal to the discharge control terminal; and
a control circuit configured to control the discharge control output circuit,
the discharge control output circuit comprising:
a first clamp voltage output circuit configured to output a first clamp voltage lower than a voltage of the first power supply terminal to the discharge control terminal to turn on the discharge control FET when the voltage of the first power supply terminal is higher than a first prescribed voltage, and a first power supply voltage output circuit configured to output the voltage of the first power supply terminal to the discharge control terminal to turn on the discharge control FET when the voltage of the first power supply terminal is equal to or less than the first prescribed voltage.

2. The charge/discharge control circuit according to claim 1, wherein the first clamp voltage is a voltage which does not to exceed a gate breakdown voltage of the discharge control FET and at which an on-resistance value of the discharge control FET is equal to or less than a desired resistance value in response to an application of the voltage to a gate of the discharge control FET.

3. The charge/discharge control circuit according to claim 1, wherein the discharge control output circuit further has a first determination circuit configured to determine whether the voltage of the first power supply terminal is equal to or less than the first prescribed voltage,
wherein the first clamp voltage output circuit comprises:
a first constant current source having one end connected to the first power supply terminal,
a first conductivity type first metal oxide semiconductor (MOS) transistor having a gate and a drain connected to the other end of the first constant current source,
at least one first conductivity type second MOS transistor connected to form a current path between a source of the first MOS transistor and the second power supply terminal and diode-connected to each other,
a first conductivity type third MOS transistor current-mirror connected to the first MOS transistor, and
a second constant current source having one end connected to a source of the third MOS transistor and the discharge control terminal, and the other end connected to the second power supply terminal,
wherein the first determination circuit comprises:
a third constant current source having one end connected to the first power supply terminal,
a first conductivity type fourth MOS transistor which has a drain connected to the other end of the third constant current source and is current-mirror connected to the second MOS transistor whose source being connected to the second power supply terminal, of said at least one second MOS transistor, and
an inverter configured to receive a voltage of the drain of the fourth MOS transistor, and
wherein the first power supply voltage output circuit comprises a second conductivity type fifth MOS transistor configured to receive an output of the inverter at a gate thereof and has a source connected to the first power supply terminal and a drain connected to the discharge control terminal.

4. The charge/discharge control circuit according to claim 1, wherein the discharge control output circuit further has a first determination circuit configured to determine whether the voltage of the first power supply terminal is equal to or less than the first prescribed voltage,
wherein the first clamp voltage output circuit comprises:
a first constant current source having one end connected to the first power supply terminal,
a first conductivity type first MOS transistor having a gate and a drain connected to the other end of the first constant current source,
at least one first conductivity type second MOS transistor connected to form a current path between a source of the first MOS transistor and the second power supply terminal and diode-connected to each other, a first conductivity type third MOS transistor current-mirror connected to the first MOS transistor, and
a second constant current source having one end connected to a source of the third MOS transistor and the discharge control terminal, and the other end connected to the second power supply terminal,
wherein the first determination circuit comprises:
a first resistor and a second resistor connected in series between the first power supply terminal and the second power supply terminal, and
a first comparator configured to receive a voltage of a connecting point of the first and second resistors at a non-inversion input terminal thereof and receives a first reference voltage at an inversion input terminal thereof, and
wherein the first power supply voltage output circuit comprises a second conductivity type fourth MOS transistor configured to receive an output voltage of the first comparator at a gate thereof and has a source connected to the first power supply terminal and a drain connected to the discharge control terminal.

5. The charge/discharge control circuit according to claim 1, further comprising:
a charge control terminal connected to a gate of a charge control FET configured to control charging of the secondary battery,
an external voltage input terminal connected to a source of the charge control FET and to which a charger is connected between the external voltage input terminal and the first power supply terminal, and
a charge control output circuit configured to output a charge control signal to the charge control terminal,
wherein the control circuit is further configured to control the charge control output circuit, and
wherein the charge control output circuit has:
a second clamp voltage output circuit configured to output a second clamp voltage lower than the voltage of the first power supply terminal to the charge control terminal to turn on the charge control FET when the voltage of the first power supply terminal is higher than a second prescribed voltage, and
a second power supply voltage output circuit configured to output the voltage of the first power supply terminal to the charge control terminal to turn on the charge control FET when the voltage of the first power supply terminal is equal to or less than the second prescribed voltage.

6. The charge/discharge control circuit according to claim 2, wherein the discharge control output circuit further has a first determination circuit configured to determine whether the voltage of the first power supply terminal is equal to or less than the first prescribed voltage,
wherein the first clamp voltage output circuit comprises:
a first constant current source having one end connected to the first power supply terminal,
a first conductivity type first MOS transistor having a gate and a drain connected to the other end of the first constant current source,
at least one first conductivity type second MOS transistor connected to form a current path between a source of the first MOS transistor and the second power supply terminal and diode-connected to each other,
a first conductivity type third MOS transistor current-mirror connected to the first MOS transistor, and
a second constant current source having one end connected to a source of the third MOS transistor and the discharge control terminal, and the other end connected to the second power supply terminal,
wherein the first determination circuit comprises:
a third constant current source having one end connected to the first power supply terminal,
a first conductivity type fourth MOS transistor which has a drain connected to the other end of the third constant current source and is current-mirror connected to the second MOS transistor whose source being connected to the second power supply terminal, of said at least one second MOS transistor, and
an inverter configured to receive a voltage of the drain of the fourth MOS transistor, and
wherein the first power supply voltage output circuit comprises a second conductivity type fifth MOS transistor configured to receive an output of the inverter at a gate thereof and has a source connected to the first power supply terminal and a drain connected to the discharge control terminal.

7. The charge/discharge control circuit according to claim 2, wherein the discharge control output circuit further has a first determination circuit configured to determine whether the voltage of the first power supply terminal is equal to or less than the first prescribed voltage,
wherein the first clamp voltage output circuit comprises:
a first constant current source having one end connected to the first power supply terminal,
a first conductivity type first MOS transistor having a gate and a drain connected to the other end of the first constant current source,
at least one first conductivity type second MOS transistor connected to form a current path between a source of the first MOS transistor and the second power supply terminal and diode-connected to each other,
a first conductivity type third MOS transistor current-mirror connected to the first MOS transistor, and
a second constant current source having one end connected to a source of the third MOS transistor and the discharge control terminal, and the other end connected to the second power supply terminal,
wherein the first determination circuit comprises:
a first resistor and a second resistor connected in series between the first power supply terminal and the second power supply terminal, and
a first comparator configured to receive a voltage of a connecting point of the first and second resistors at a non-inversion input terminal thereof and receives a first reference voltage at an inversion input terminal thereof, and
wherein the first power supply voltage output circuit comprises a second conductivity type fourth MOS transistor configured to receive an output voltage of the first comparator at a gate thereof and has a source connected to the first power supply terminal and a drain connected to the discharge control terminal.

8. The charge/discharge control circuit according to claim 2, further comprising:
a charge control terminal connected to a gate of a charge control FET configured to control charging of the secondary battery,
an external voltage input terminal connected to a source of the charge control FET and to which a charger is connected between the external voltage input terminal and the first power supply terminal, and
a charge control output circuit configured to output a charge control signal to the charge control terminal,
wherein the control circuit is further configured to control the charge control output circuit, and
wherein the charge control output circuit has:
a second clamp voltage output circuit configured to output a second clamp voltage lower than the voltage of the first power supply terminal to the charge control terminal to turn on the charge control FET when the voltage of the first power supply terminal is higher than a second prescribed voltage, and
a second power supply voltage output circuit configured to output the voltage of the first power supply terminal to the charge control terminal to turn on the charge control FET when the voltage of the first power supply terminal is equal to or less than the second prescribed voltage.

9. The charge/discharge control circuit according to claim 3, further comprising:
a charge control terminal connected to a gate of a charge control FET configured to control charging of the secondary battery,
an external voltage input terminal connected to a source of the charge control FET and to which a charger is connected between the external voltage input terminal and the first power supply terminal, and
a charge control output circuit configured to output a charge control signal to the charge control terminal,
wherein the control circuit is further configured to control the charge control output circuit, and
wherein the charge control output circuit has:
a second clamp voltage output circuit configured to output a second clamp voltage lower than the voltage of the first power supply terminal to the charge control terminal to turn on the charge control FET when the voltage of the first power supply terminal is higher than a second prescribed voltage, and
a second power supply voltage output circuit configured to output the voltage of the first power supply terminal to the charge control terminal to turn on the charge control FET when the voltage of the first power supply terminal is equal to or less than the second prescribed voltage.

10. The charge/discharge control circuit according to claim 4, further comprising:
a charge control terminal connected to a gate of a charge control FET configured to control charging of the secondary battery,
an external voltage input terminal connected to a source of the charge control FET and to which a charger is connected between the external voltage input terminal and the first power supply terminal, and
a charge control output circuit configured to output a charge control signal to the charge control terminal,
wherein the control circuit is further configured to control the charge control output circuit, and
wherein the charge control output circuit has:
a second clamp voltage output circuit configured to output a second clamp voltage lower than the voltage of the first power supply terminal to the charge control terminal to turn on the charge control FET when the voltage of the first power supply terminal is higher than a second prescribed voltage, and
a second power supply voltage output circuit configured to output the voltage of the first power supply terminal to the charge control terminal to turn on the charge control FET when the voltage of the first power supply terminal is equal to or less than the second prescribed voltage.

11. The charge/discharge control circuit according to claim 5, wherein the second clamp voltage is a voltage which does not to exceed a gate breakdown voltage of the charge control FET and at which an on-resistance value of the charge control FET is equal to or less than a desired resistance value in response to an application of the voltage to a gate of the charge control FET.

12. The charge/discharge control circuit according to claim 5, wherein the charge control output circuit further has a second determination circuit configured to determine whether the voltage of the first power supply terminal is equal to or less than the second prescribed voltage,
wherein the second clamp voltage output circuit comprises:
a fourth constant current source having one end connected to the first power supply terminal,
a first conductivity type sixth MOS transistor having a gate and a drain connected to the other end of the fourth constant current source,
at least one first conductivity type seventh MOS transistor connected to form a current path between a source of the sixth MOS transistor and the external voltage input terminal and diode-connected to each other,
a first conductivity type eighth MOS transistor current-mirror connected to the sixth MOS transistor, and
a fifth constant current source having one end connected to a source of the eighth MOS transistor and the charge control terminal, and the other end connected to the external voltage input terminal,
wherein the second determination circuit comprises:
a sixth constant current source having one end connected to the first power supply terminal,
a first conductivity type ninth MOS transistor which has a drain connected to the other end of the sixth constant current source and is current-mirror connected to the seventh MOS transistor whose source being connected to the external voltage input terminal, of said at least one seventh MOS transistor, and
an inverter configured to receive a voltage of the drain of the ninth MOS transistor, and
wherein the second power supply voltage output circuit comprises a second conductivity type tenth MOS transistor configured to receive an output of the inverter at a gate thereof and has a source connected to the first power supply terminal and a drain connected to the charge control terminal.

13. The charge/discharge control circuit according to claim 5, wherein the charge control output circuit further has a second determination circuit configured to determine whether the voltage of the first power supply terminal is equal to or less than the second prescribed voltage,
wherein the second clamp voltage output circuit comprises:
a third constant current source having one end connected to the first power supply terminal,
a first conductivity type fifth MOS transistor having a gate and a drain connected to the other end of the third constant current source,
at least one first conductivity type sixth MOS transistor connected to form a current path between a source of the fifth MOS transistor and the external voltage input terminal and diode-connected to each other,
a first conductivity type seventh MOS transistor current-mirror connected to the fifth MOS transistor, and
a fourth constant current source having one end connected to a source of the seventh MOS transistor and the charge control terminal, and the other end connected to the external voltage input terminal,
wherein the second determination circuit comprises:
a third resistor and a fourth resistor connected in series between the first power supply terminal and the external voltage input terminal, and
a second comparator configured to receive a voltage of a connecting point of the third and fourth resistors at a non-inversion input terminal thereof and receives a second reference voltage at an inversion input terminal thereof, and
wherein the second power supply voltage output circuit comprises a second conductivity type eighth MOS transistor configured to receive an output voltage of the second comparator at a gate thereof and has a source connected to the first power supply terminal and a drain connected to the charge control terminal.

14. A battery apparatus comprising:
a charge/discharge control circuit according to claim 1.

15. A charge/discharge control circuit comprising:
a first power supply terminal connected to a first electrode of a secondary battery;
a charge control terminal connected to a gate of a charge control field effect transistor (FET) configured to control charging of the secondary battery;
an external voltage input terminal connected to a source of the charge control FET and to which a charger is connected between the external voltage input terminal and the first power supply terminal;
a charge control output circuit configured to output a charge control signal to the charge control terminal; and
a control circuit configured to control the charge control output circuit,
the charge control output circuit comprising:
a clamp voltage output circuit configured to output a clamp voltage lower than a voltage of the first power supply terminal to the charge control terminal to turn on the charge control FET when the voltage of the first power supply terminal is higher than a prescribed voltage, and
a power supply voltage output circuit configured to output the voltage of the first power supply terminal to the charge control terminal to turn on the charge control FET when the voltage of the first power supply terminal is equal to or less than the prescribed voltage.

16. The charge/discharge control circuit according to claim 15, wherein the clamp voltage is a voltage which does not to exceed a gate breakdown voltage of the charge control FET and at which an on-resistance value of the charge control FET is equal to or less than a desired resistance value in response to an application of the voltage to a gate of the charge control FET.

17. The charge/discharge control circuit according to claim 15, wherein the charge control output circuit further has a determination circuit configured to determine whether the voltage of the first power supply terminal is equal to or less than the prescribed voltage,
wherein the clamp voltage output circuit comprises:
a first constant current source having one end connected to the first power supply terminal,
a first conductivity type first metal oxide semiconductor (MOS) transistor having a gate and a drain connected to the other end of the first constant current source,
at least one first conductivity type second MOS transistor connected to form a current path between a source of the first MOS transistor and the external voltage input terminal and diode-connected to each other, a first conductivity type third MOS transistor current-mirror connected to the first MOS transistor, and a second constant current source having one end connected to a source of the third MOS transistor and the charge control terminal, and the other end connected to the external voltage input terminal, wherein the determination circuit comprises:

a third constant current source having one end connected to the first power supply terminal, a first conductivity type fourth MOS transistor which has a drain connected to the other end of the third constant current source and is current-mirror connected to the second MOS transistor whose source being connected to the external voltage input terminal, of said at least one second MOS transistor, and an inverter configured to receive a voltage of the drain of the fourth MOS transistor, and wherein the power supply voltage output circuit comprises a second conductivity type fifth MOS transistor configured to receive an output of the inverter at a gate thereof and has a source connected to the first power supply terminal and a drain connected to the charge control terminal.

18. The charge/discharge control circuit according to claim 15, wherein the charge control output circuit further has a determination circuit configured to determine whether the voltage of the first power supply terminal is equal to or less than the prescribed voltage, wherein the clamp voltage output circuit comprises:

a first constant current source having one end connected to the first power supply terminal, a first conductivity type first MOS transistor having a gate and a drain connected to the other end of the first constant current source, at least one first conductivity type second MOS transistor connected to form a current path between a source of the first MOS transistor and the external voltage input terminal and diode-connected to each other, a first conductivity type third MOS transistor current-mirror connected to the first MOS transistor, and a second constant current source having one end connected to a source of the third MOS transistor and the charge control terminal, and the other end connected to the external voltage input terminal, wherein the determination circuit comprises:

a first resistor and a second resistor connected in series between the first power supply terminal and the external voltage input terminal, and a comparator configured to receive a voltage of a connecting point of the first and second resistors at a non-inversion input terminal thereof and receives a reference voltage at an inversion input terminal thereof, and wherein the power supply voltage output circuit comprises a second conductivity type fourth MOS transistor configured to receive an output voltage of the comparator at a gate thereof and has a source connected to the first power supply terminal and a drain connected to the charge control terminal.

19. A battery apparatus comprising:

a charge/discharge control circuit according to claim 15.

* * * * *